United States Patent
Haspel et al.

(10) Patent No.: US 6,921,119 B2
(45) Date of Patent: Jul. 26, 2005

(54) LUGGAGE COMPARTMENT FOR A MOTOR VEHICLE

(75) Inventors: Klaus Haspel, Rottenburg (DE); Werner P. Schlecht, Vaihingen/Enz (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/332,020

(22) PCT Filed: Jul. 3, 2001

(86) PCT No.: PCT/EP01/07598

§ 371 (c)(1),
(2), (4) Date: May 19, 2003

(87) PCT Pub. No.: WO02/02371

PCT Pub. Date: Jan. 10, 2002

(65) Prior Publication Data

US 2003/0184107 A1 Oct. 2, 2003

(30) Foreign Application Priority Data

Jul. 5, 2000 (DE) .......................................... 100 32 706
Sep. 22, 2000 (DE) .......................................... 100 47 542

(51) Int. Cl.[7] ................................................ B60R 7/02
(52) U.S. Cl. ................. 296/24.4; 296/24.44; 296/37.16
(58) Field of Search ............................ 296/24.4, 24.44, 296/24.45, 37.8, 37.16, 24.1

(56) References Cited

U.S. PATENT DOCUMENTS

| | | | | |
|---|---|---|---|---|
| 2,934,248 A | * | 4/1960 | Lown | 296/24.1 |
| 4,932,704 A | * | 6/1990 | Ament | 296/37.16 |
| 5,314,276 A | * | 5/1994 | Barone | 410/139 |
| 5,599,086 A | * | 2/1997 | Dutta | 296/214 |
| 5,669,537 A | * | 9/1997 | Saleem et al. | 224/539 |
| 5,715,978 A | | 2/1998 | Ackeret | 224/42.33 |
| 5,951,085 A | * | 9/1999 | Fukatsu | 296/37.8 |
| 6,270,137 B1 | * | 8/2001 | Minix et al. | 296/24.1 |
| 6,290,277 B1 | * | 9/2001 | Spykerman et al. | 296/24.1 |

FOREIGN PATENT DOCUMENTS

| | | |
|---|---|---|
| DE | 1 895 469 | 6/1964 |
| DE | 198 37 685 | 10/1999 |

* cited by examiner

Primary Examiner—Dennis H. Pedder
(74) Attorney, Agent, or Firm—Flynn, Thiel, Boutell & Tanis, P.C.

(57) ABSTRACT

A luggage compartment for a motor vehicle, comprising a bottom (2) and two opposite-lying flat side trim panels (4), is already known per se. According to the invention, functional tracks (5–7) extending cross-wise and in a longitudinal direction are provided in the region of each side wall. Said tracks are, at least partially, spatially integrated into the side trim panels. The invention is used in passenger vehicles.

5 Claims, 10 Drawing Sheets

LUGGAGE COMPARTMENT FOR A MOTOR VEHICLE

The invention relates to a luggage or loading compartment for a motor vehicle bounded on different sides by interior surfaces.

Such a luggage compartment is already known for an estate car or station wagon (present BMW 5 series touring range). Towards the rear this luggage compartment is bounded by a tailgate, to the front by a back rest of a back seat, to the vehicle sides by in each case a side panel, downwards by a luggage compartment base and upwards by a roof lining. Both the tailgate and the rear of the back rest, the side panels and the luggage compartment base form interior surfaces. The side panels are planar and project at right angles in the upwards direction towards the luggage compartment base. The facing side panels are consequently oriented parallel to one another. In the vicinity of the luggage compartment base is provided a flap, through which a cavity located below the luggage compartment base is accessible. In the vicinity of the loading compartment base vehicle-fixed, anchored retaining rings are provided for clamping and fixing articles transported in the luggage compartment.

The problem of the invention is to provide a luggage compartment of the aforementioned type allowing a variable structuring and use of the luggage compartment.

This problem is solved in that in the vicinity of at least two different interior surfaces are provided several functional tracks, which are at least partly spatially integrated into the interior walls. Through the preferably horizontal and vertical, relative to the luggage compartment, functional tracks, it is possible to design the luggage compartment in an extremely variable manner and provide it with numerous different functions. These can be holding, guiding, supporting or other functions, which allows a comprehensive, variable luggage compartment management. As a function of the intended use, the luggage compartment can be rapidly and simply redesigned, in that the in each case suitable, additional functional parts are connected to and/or guided in the functional tracks. The functional tracks are preferably linear and have in in each case one line a row of function points such as notches or the like or also through longitudinal guides, rows of different electrical terminals and similar functional units or combinations of such functions. The corresponding guide tracks can consequently be provided in modular manner as a function of the desired use. The partial or complete spatial integration of the functional tracks into the interior surfaces means that the functional tracks are at least partly embedded in said surfaces and preferably terminate substantially flush with said surfaces. The planar face of the interior surfaces is consequently not significantly interrupted by the functional tracks. The interior surfaces can be formed both as panel parts and also by preferably planar faces of interior fitting units such as by body parts (particularly roof or horizontal tail cover or sloping or vertical tailgates). The functional tracks can be provided either within the faces of the interior surfaces or at the corner areas or also between two adjacent interior surfaces, particularly in the form of corner or angle profiles.

According to a development of the invention the functional tracks face one another in pairs at the facing interior surfaces. As a result of the pairwise facing arrangement of the functional tracks it is possible for the facing functional tracks to cooperate, particularly in the segmenting of the boot or trunk by depositing plates at different heights, vertically and transversely extending separating structures, collecting nets, safety gratings or the like. It is also possible to combine with one another different pairs of functional tracks with different functions.

According to a further development of the invention at least one pair of facing functional tracks takes over fixing or holding functions for functional parts positioned in the luggage compartment. Such functional parts are in particular horizontal cover layers extending over part of the surface of the luggage compartment base or over the entire surface thereof. Functional parts in this development are, in addition to horizontal functional parts, also vertical functional parts such as separating or safety gratings, separating or reception nets, etc.

According to a further development of the invention there are vertically or horizontally positionable segmenting or covering parts, which are provided with fixing elements matched to the fixing functions of the functional tracks. This makes it possible, as desired, to obtain different luggage compartment structuring.

According to a further development of the invention at least one pair of facing functional tracks has longitudinal guidance functions, particularly for the displacement of segmenting or covering parts. The segmenting or covering parts can appropriately be extractable cover or separating window shades with interrupted or through flat structures, particularly in net or web form.

According to a further development of the invention the functional tracks are provided with fixing grids. This makes it possible to position corresponding functional parts stepwise at different heights or different depths of the luggage compartment. The fastening grids can be provided in a profile rail, which has a row of uniformly successively spaced fastening receptacles. It is possible to have a ladder-like construction and corresponding rungs or webs take over the holding function. It can be provided with differently designed receptacles such as recesses, depressions, passages, etc.

According to a further development of the invention the functional tracks are provided with supporting or bearing functions. A corresponding functional track arrangement can consequently be provided for supporting and bearing the luggage compartment base.

According to a further development of the invention the functional tracks are formed by profile units, which are in particular joined by support sections to parts of the carcass body. Corresponding carcass body parts are the adjacent body parts, which are alongside corresponding functional tracks. As a result of the direct linking of the functional tracks, i.e. profile units, to the carcass body a high stability is achieved, which allows holding and fastening functions particularly with respect to crashproof segmentations or coverings. The profile units are in particular in the form of corner profiles, which are adjacent to two interior surfaces preferably oriented at right angles to one another or directly form the corner or edge regions of said interior surfaces. The profile units are preferably in the form of profile rails, which are preferably made from metal.

According to a further development of the invention the functional tracks border at least one cross-sectionally quadrangular cavity, which extends the luggage compartment capacity. As a result of the structuring of the interior surfaces by means of the functional tracks, the latter can also form corresponding frames for such cavities. The cavities can be zonally or completely covered by window shades, nets, flaps or closing parts. The cavities can also be designed for receiving removable or outwardly pivotable containers.

Further advantages and features of the invention can be gathered from the following claims, a description of preferred embodiments and the attached drawings, wherein show:

A loading or luggage compartment for a car according to FIGS. 1 to 22 has a luggage compartment base 2, which considered in the direction of travel, is bounded at the front by a back seat 3. On opposite vehicle sides the luggage compartment is bounded by side panels 4, which in the embodiment shown extend vertically and in the vehicle longitudinal direction and consequently face one another in parallel. The side panels 4 are in each case planar, which gives a virtually parallelepipedic luggage compartment capacity. The luggage compartment construction shown in FIGS. 1 to 22 in each case illustrate a car luggage compartment with a tailgate. In other embodiments of the invention there are corresponding luggage compartments for other types of motor vehicles, particularly for stepped tail or large-capacity limousines, transporters, etc. Apart from the interior surfaces of the loading compartment designed as side panels 4, the loading compartment base 2 is an interior surface. The back of the back seat 3 also constitutes an interior surface in the sense of the invention. The same applies to an inside of a tailgate (FIG. 20), which is also an interior surface in the sense of the invention. A roof area (FIG. 19) is also an interior surface according to the invention. The same applies with regards to the not shown insides of tail covers, other vehicle interior fittings and the like.

With the side panels are associated different functional tracks 5 to 7, which are at least partly spatially integrated into the side panels 4. The functional tracks 5 to 7 are provided in mirror symmetrical manner on the facing vehicle sides, so that the functional tracks 5 to 7 face one another in pairs. There are three vertical functional tracks 5, which extend in uniformly spaced manner over the entire height of the side panels 4. In the vicinity of their upper ends the vertical functional tracks 5 are bounded by a horizontal, upper functional track 6, which extends horizontally over the entire luggage compartment length. In the base region of the side panels 4 a lower horizontal functional track 7 is provided on each side, extends over the entire lower length of the luggage compartment and is parallel to the upper, horizontal functional track 6. The pairwise facing functional tracks 5, 6, 7 on the opposite sides are in each case oriented parallel to one another.

Figure 2:
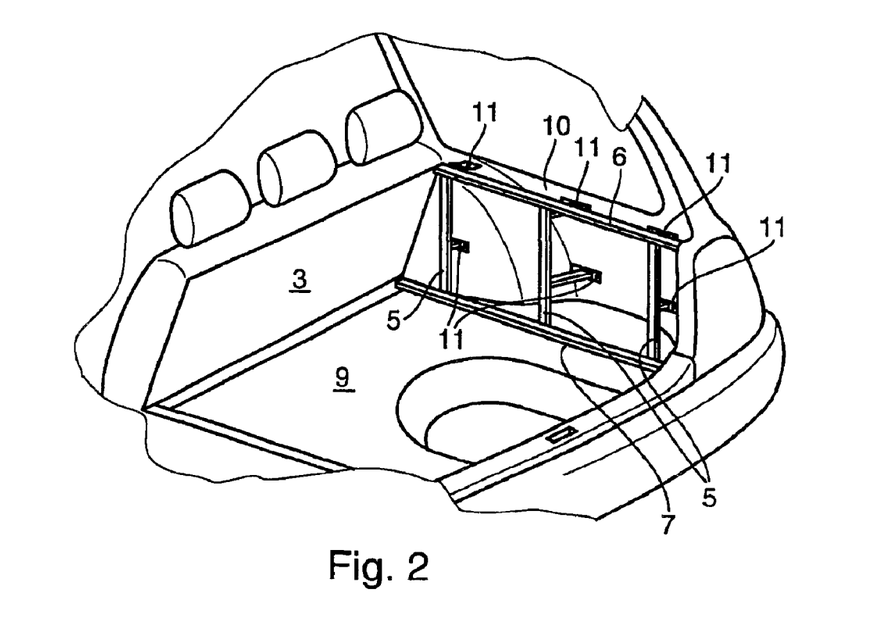
FIG. 2 The loading compartment according to FIG. 1 in the vehicle carcass.
Figures 3, 4, 5:
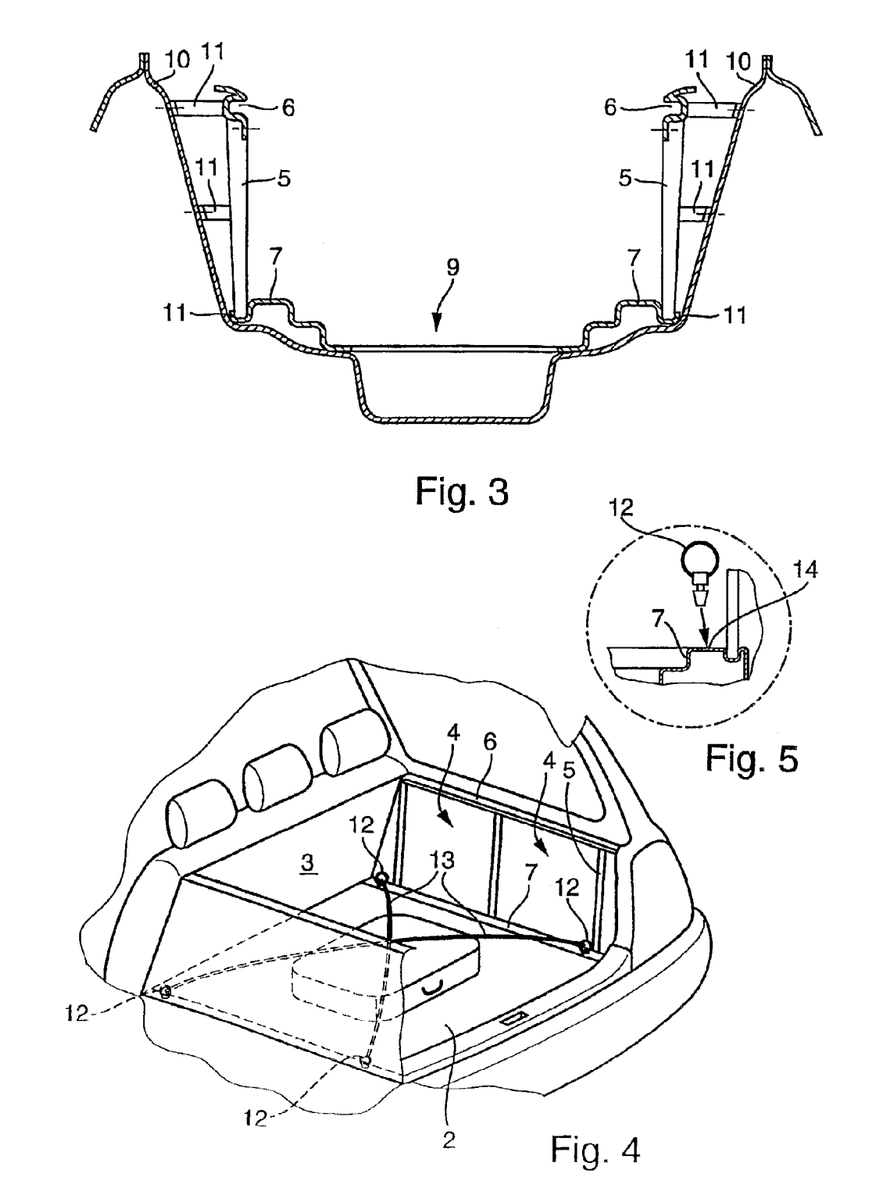
FIG. 3 A cross-section through the loading compartment according to FIGS. 1 and 2 on a larger scale.
FIGS. 4 to 22 The loading compartment or parts thereof with different, exemplified use functions.

As is apparent from FIG. 2, the functional tracks 5 to 7 are fixed on the carcass side, in that they are connected by means of corresponding support sections 11 in firm manner to the inner side parts 10 of the carcass body (FIGS. 2 and 3). The support sections 11 are preferably welded both to the functional tracks 5 to 7 and to the inner side parts 10 of the carcass body, which gives a stable union of the functional tracks 5 to 7 with the carcass body. The functional tracks 5 to 7 also provide mutual support to one another, in that the upper and lower ends of the vertical functional tracks 5 are firmly connected to the upper and lower horizontal functional tracks 6, 7. Here again welds or other fastening modes can be provided. In place of welds, the support sections 11 can be joined to the side parts 10 with differently designed releasable or non-releasable fastening elements.

In the embodiment shown the functional tracks 5 to 7 are formed by through, linear profile rails, in which are provided longitudinal guidance grooves (functional tracks 6), grid rows for fastening elements (functional tracks 5 according to FIG. 1) and/or bearing and support flanges (functional tracks 7). The bearing and support flanges of the lower horizontal functional tracks are in particular provided for assuming responsibility for the bearing and support of the luggage compartment base 2. Below the luggage compartment base 2 is provided the carcass base 9, which in fundamentally known manner can be provided with at least one depression for receiving a spare wheel or the like. The functional tracks 5 can have a ladder-like construction (FIG. 1), so that the transverse webs or rungs for hanging in or connection purposes are provided with corresponding fastening elements of the functional parts.

Figure 6:
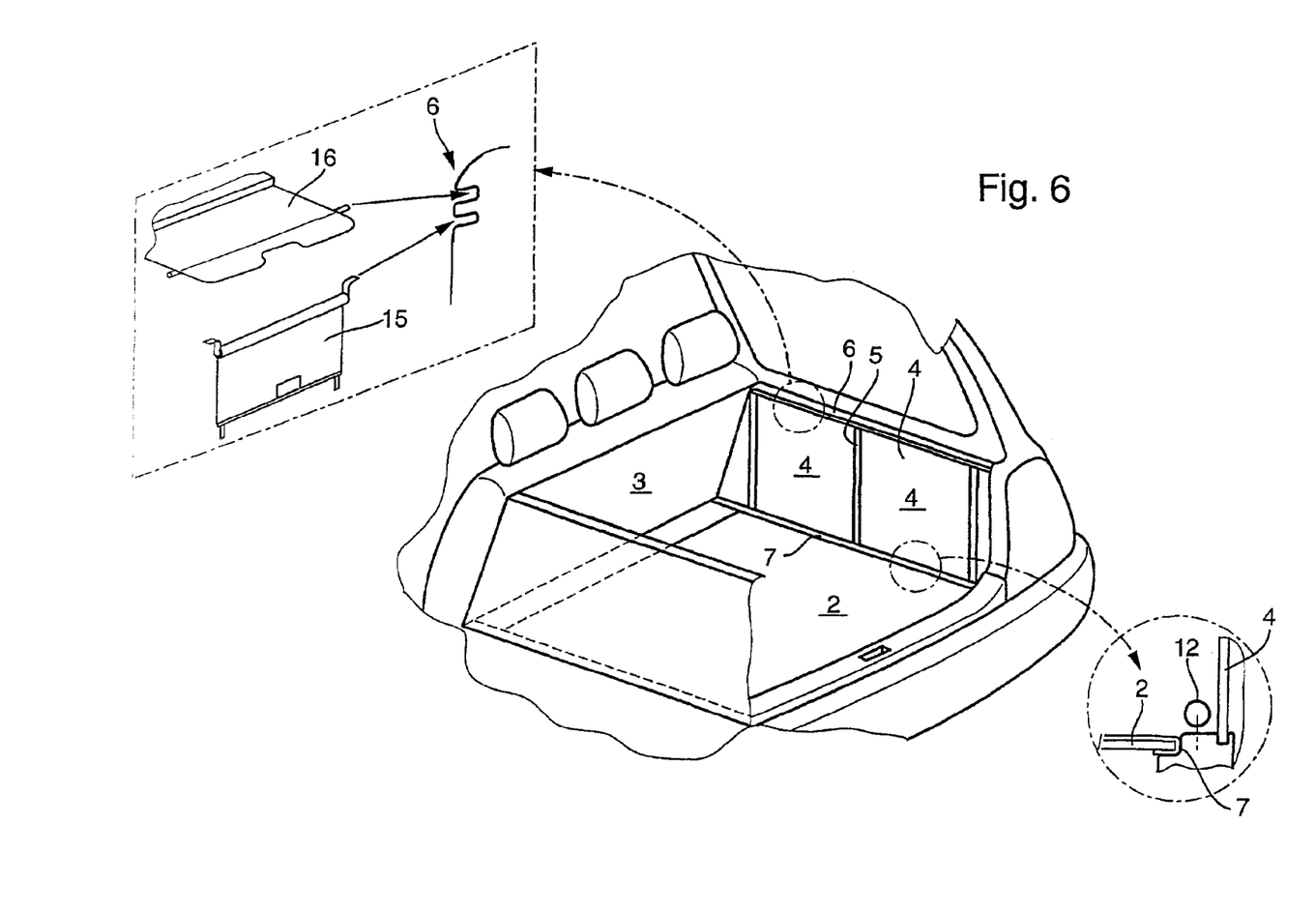

In addition, the lower, horizontal functional tracks 7 have a row of holes in the vehicle longitudinal direction and in which can be anchored, according to FIGS. 5 and 6, retaining rings 12, which can have different uses and in particular secure safety belts 13.

Between the functional tracks, i.e. profile rails, are positioned the areal panel parts of the side panels 4 and are fastened in a suitable manner.

In place of a row of holes for fastening purposes the functional tracks 7 can also have fastening rails on which are secured by clamping and in continuous manner corresponding holding or fastening elements.

Figure 1:
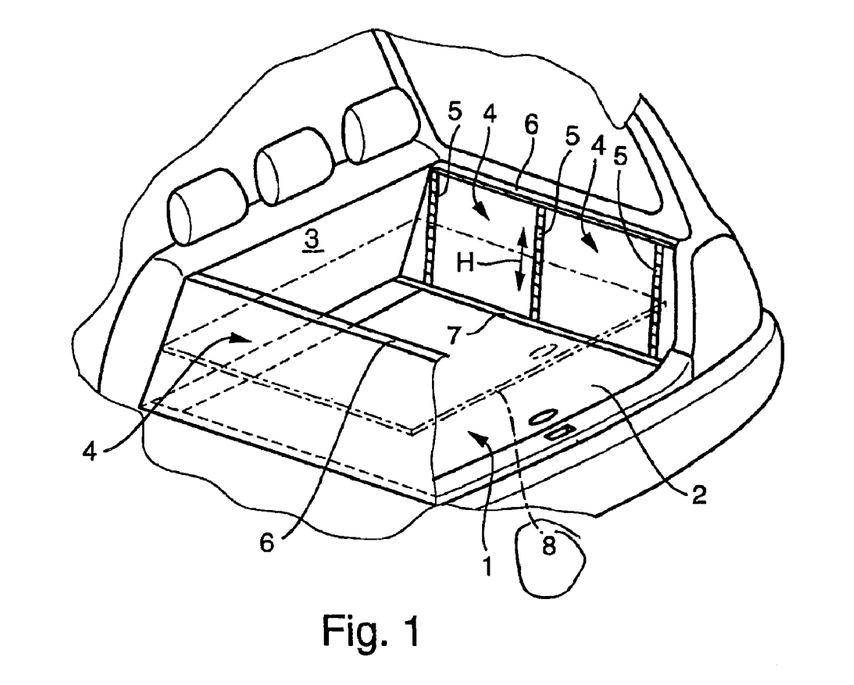
FIG. 1 Diagrammatically and in perspective form an embodiment of a luggage compartment according to the invention.

As is apparent from FIG. 1, also the vertical functional tracks 5, i.e. the profile rails, are provided with grid rows in the form of holding or fastening receptacles. As a result it is possible to secure the functional parts stepwise in different heights. This is represented in FIG. 1 by a cover 8, as the functional part, extending over the entire width and depth of the luggage compartment. In similar manner to a cover net 8' provided with a frame according to FIG. 8, cover 8 is provided in the corner regions with fastening elements 21, which correspond to the fastening or holding receptacles of the vertical functional tracks 5 and ensure releasable hanging in, locking or other fastenings for said functional parts. A net 22 according to FIG. 9 corresponds to the fundamental structure of the net 8' according to FIG. 8, but it only extends over half of the luggage compartment depth and is consequently solely positioned between the two rear, vertical functional tracks 5.

Figure 10:
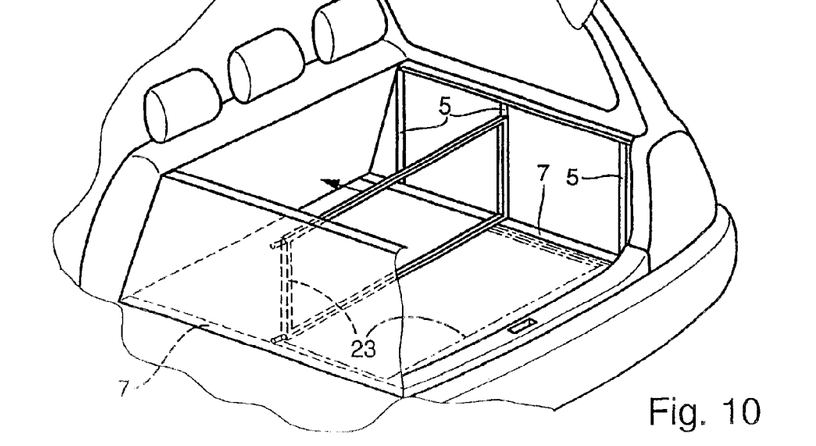
Figure 12:
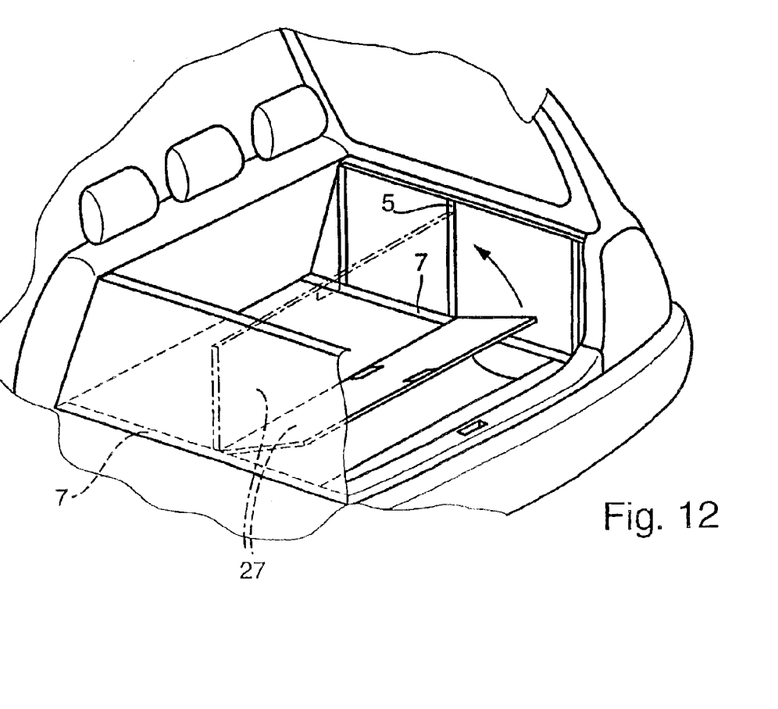
Figure 13:
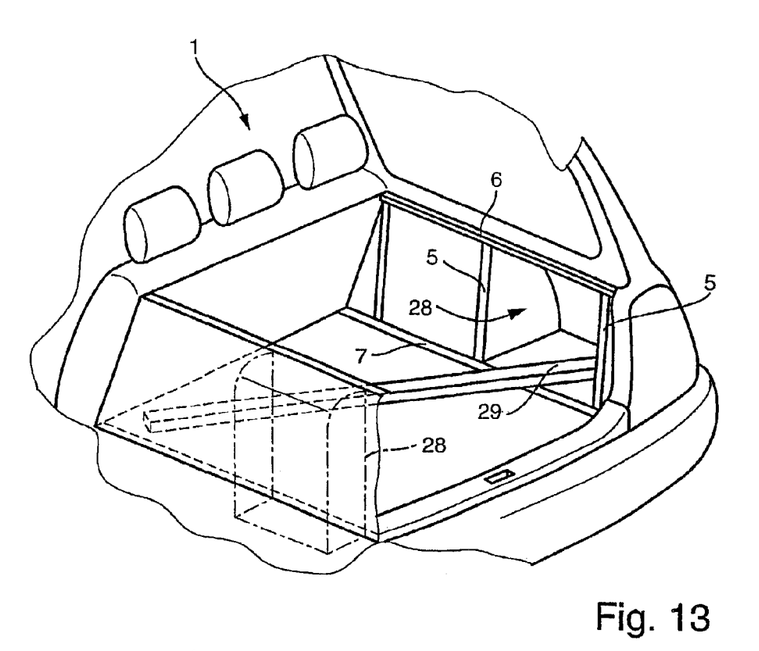
Figure 14:
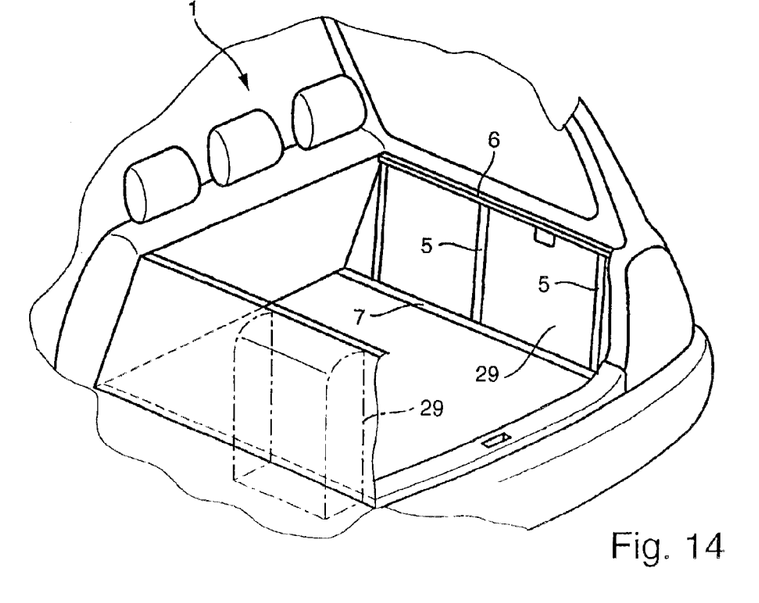

As is apparent from FIGS. 10 and 12, the vertical functional tracks 5 can be provided not only for holding or fastening horizontal functional parts, but also for the corresponding fastening of vertical functional parts 23, 27, which can be transferred from horizontal positions resting on the luggage compartment base into a vertical segmenting function. Both functional parts 23, 27 extend over the entire luggage compartment width. The functional part 23 is a flexible separating or covering net provided with a frame. The functional part 27 is a cover plate in the vicinity of the luggage compartment base, which in a vertical position can be designed as a partition. On the opposite sides the cover plate 27 has corresponding locking elements, which are matched to the fastening receptacles of the vertical functional tracks 5.

Figure 7:
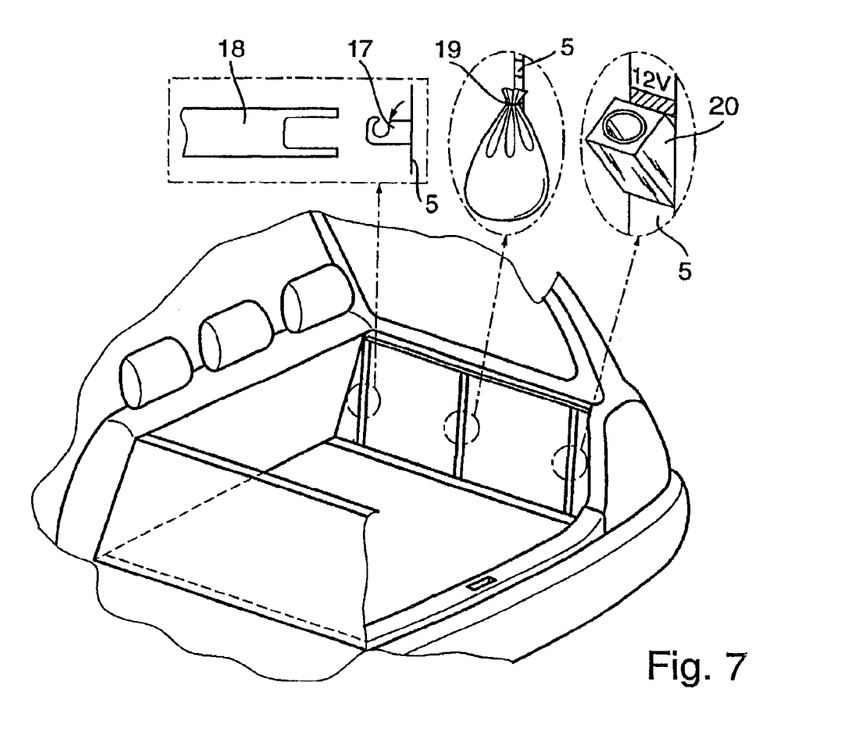
Figure 8:
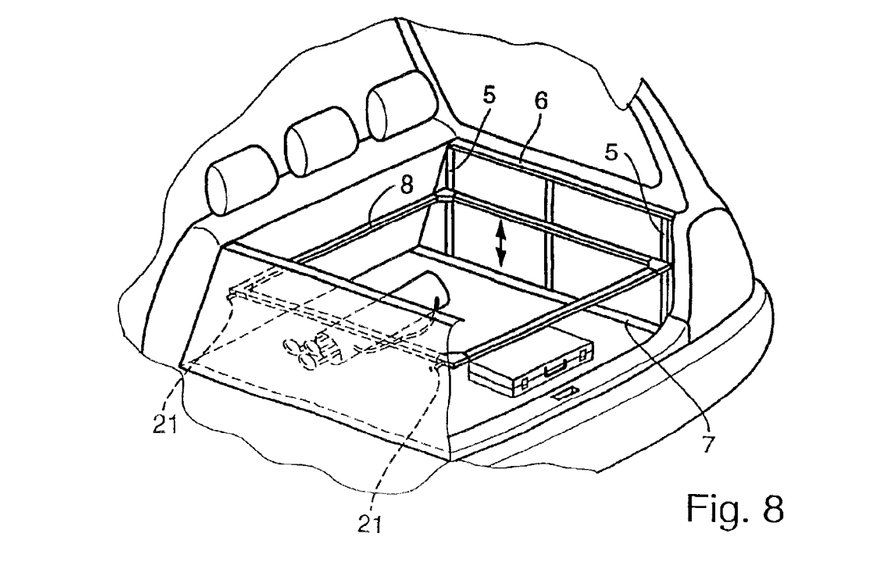
Figure 9:
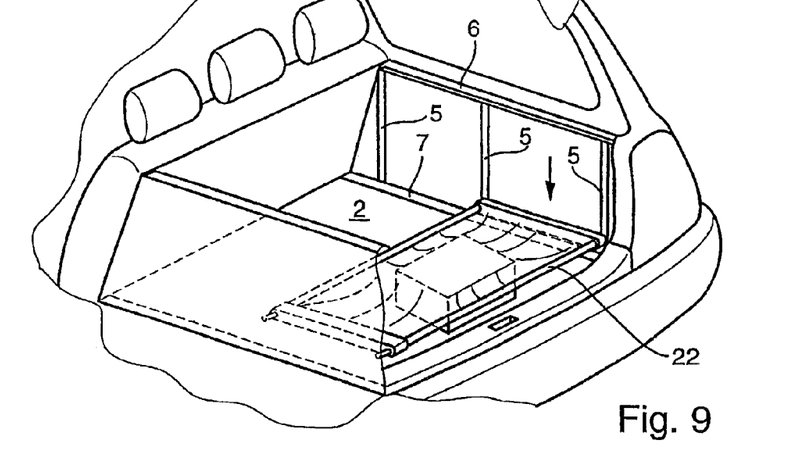

As can be gathered from FIG. 7, the vertical functional tracks 5 can have further, exemplified functions. Thus, into the rear, vertical functional tracks 5 can be integrated electrical terminals 20. In this case the functional track 5 can be a modular support for different functional elements, in that in particular alongside the electrical terminals 20 fastening receptacles can be provided above and below. The fastening and holding receptacles of the functional track can also be used for receiving fastening hooks 19 on which the transported articles can be positioned. Finally, the functional tracks 5 can have foldable and unfoldable hooks 17, which are either used for holding transported articles or, according to FIG. 7, as plug-in elements for positioning a plate-like functional part 18 with a corresponding plug-in groove.

Figure 11:
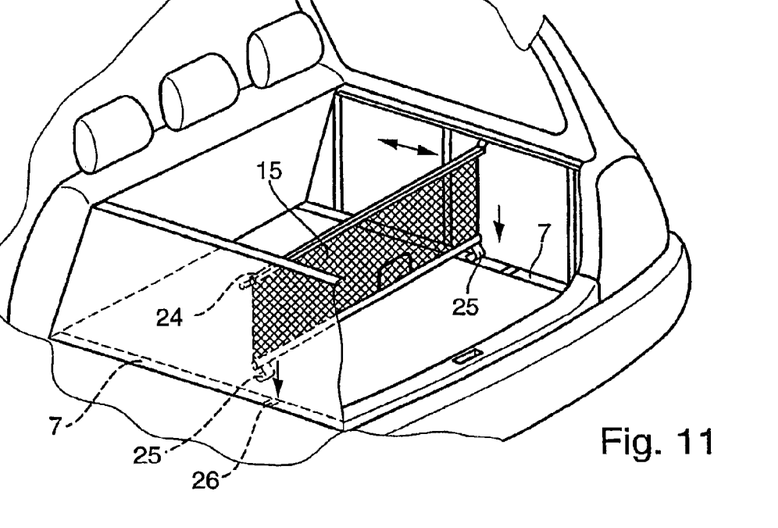

The upper, horizontal tracks 6 are in particular provided for through linear guidance, in that they are designed as profile rails provided with a longitudinal groove in which can be positioned, according to FIGS. 6 and 11, a casing running in the vehicle transverse direction of a bottom-extractable flat structure 15. At the lower end of the flat structure 15 is provided an extraction strip, which has a hang-in hook 25, which is matched to corresponding holding webs 26 in the lower, horizontal guide tracks 7, so that it can be hung in there. In addition, the upper, horizontal functional tracks can be provided for the extraction of a hood 16 according to FIGS. 6 and 18.

In the embodiments according to FIGS. 13 to 17 the side panels are designed in such a way that at least one cavity 28 is formed between the functional tracks 5 to 7. Said cavity can be used for receiving long articles, which increases the luggage compartment capacity. According to FIGS. 14 and 17 the cavities 28 can also be filled with flush-fittable containers 29 and the containers 29 according to FIGS. 14 and 17 can be held detachably in the cavities 28 in such a way that they can be removed and carried in suitcase-like manner by means of a handle.

Figure 15:
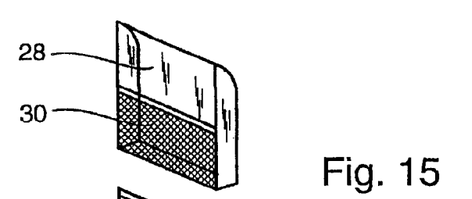
Figure 16:
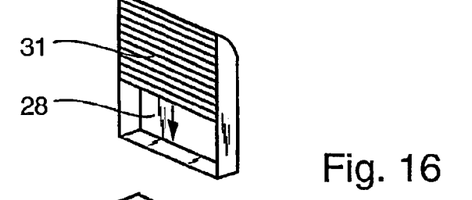
Figure 17:
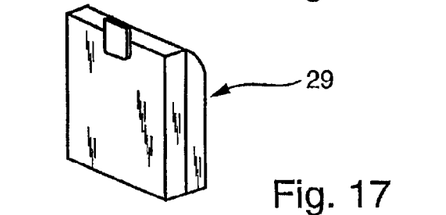
Figure 18:
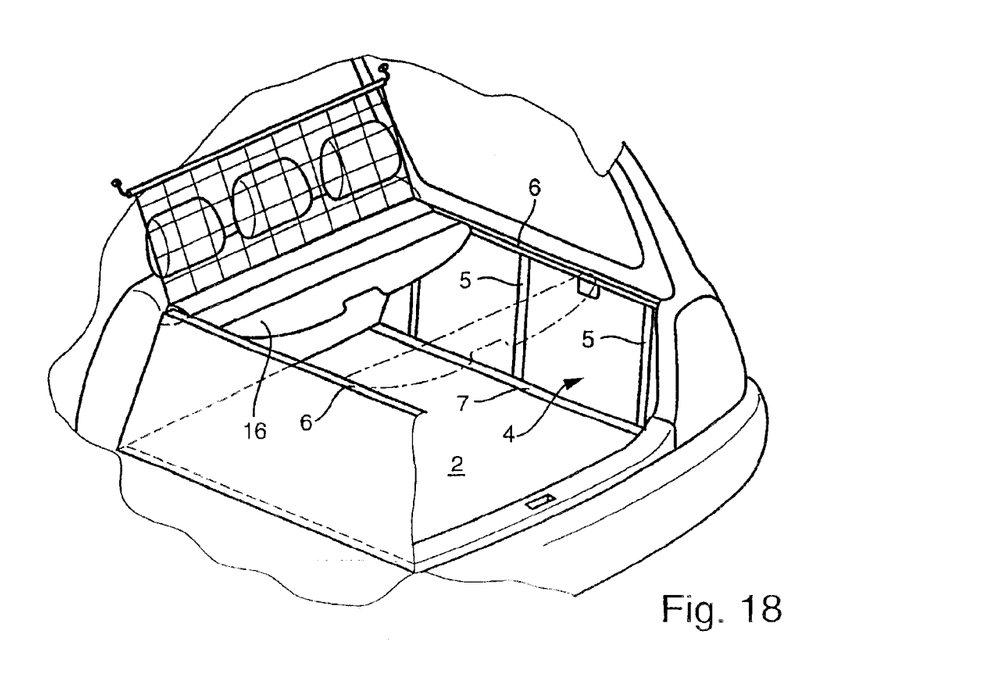

FIGS. 15 and 16 show in exemplified manner two variants for at least partly covering the cavity 28. For this purpose there is either a net 30, which together with the cavity 18 forms a pocket-like depression, or a closing window shade 31 is provided which, if necessary, can completely close the cavity 28.

Figure 19:
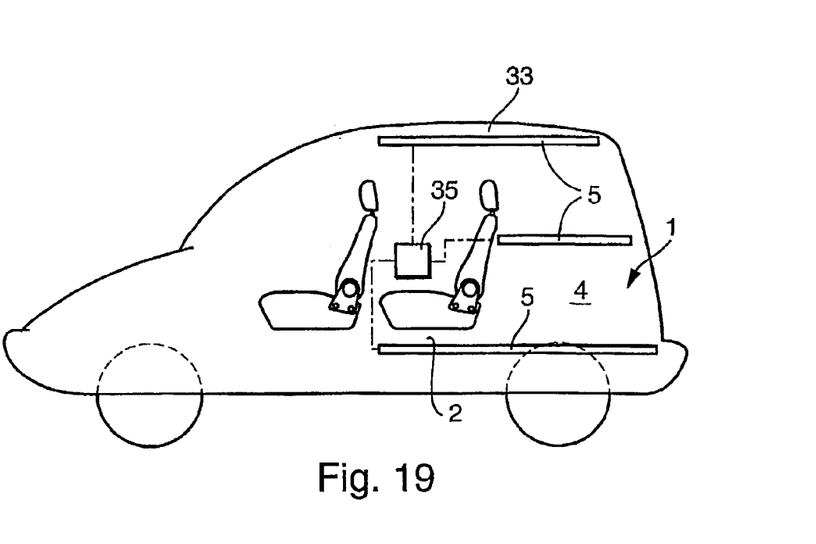

In the case of a vehicle according to FIG. 19 a luggage compartment 1 contains several functional tracks 5, which are located both in the vicinity of a luggage compartment base 2 and in the vicinity of the side panels 4 and in a roof area 33. In the vicinity of the luggage compartment base 2 and in the roof area the functional tracks 5 extend over and beyond the back seat area, so that when the back rest of the back seat is turned back and the luggage compartment is correspondingly enlarged, it is still possible to use the functional tracks 5. The functional tracks 5 of the luggage compartment 1 according to FIG. 19 receive power supply and/or data lines, which are represented diagrammatically in dot-dash manner. These power supply or data lines, which do not carry reference numerals, are connected to an electronic power supply and/or data processing centre 35, which is diagrammatically intimated in FIG. 19.

Figure 20:
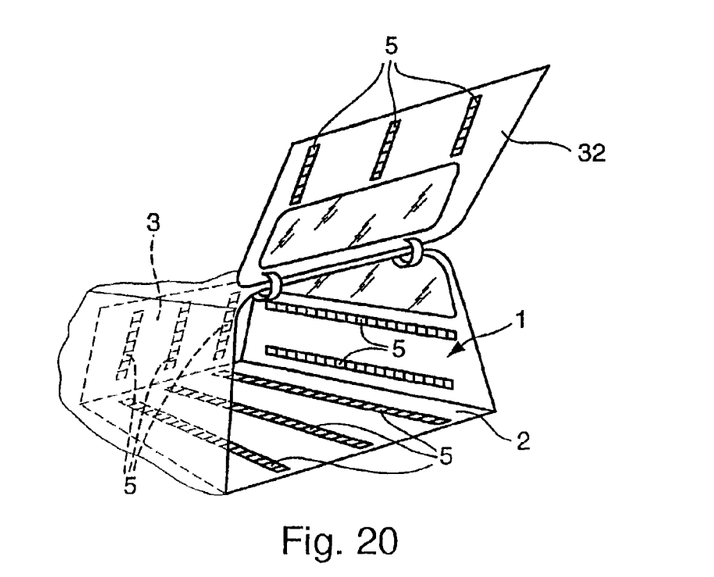

In the embodiment according to FIG. 20 supplementary functional tracks are positioned on a back of a back rest 3 of the back seat and at least part of these functional tracks 5 are aligned with the functional tracks 5 of the luggage compartment base 2 in such a way that when the back rest is turned back there is a substantially linear transition between these functional tracks. Also in the vicinity of the interior surface 32 of the tailgate there are several functional tracks 5, which are located in identical, vertical vehicle longitudinal planes to the associated functional tracks 5 in the vicinity of the luggage compartment base 2 and the back rest of the back seat 3.

Figure 21:
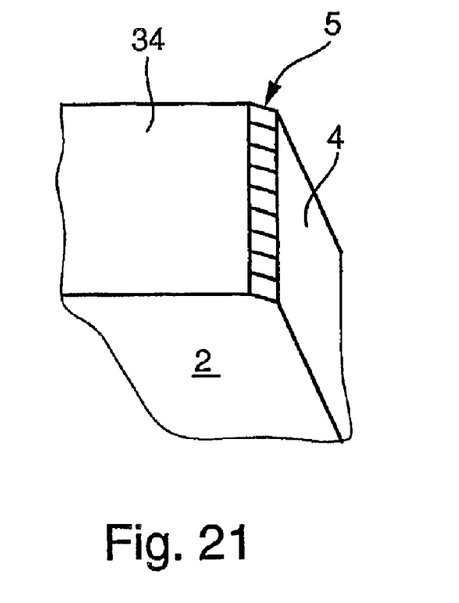
Figure 22:
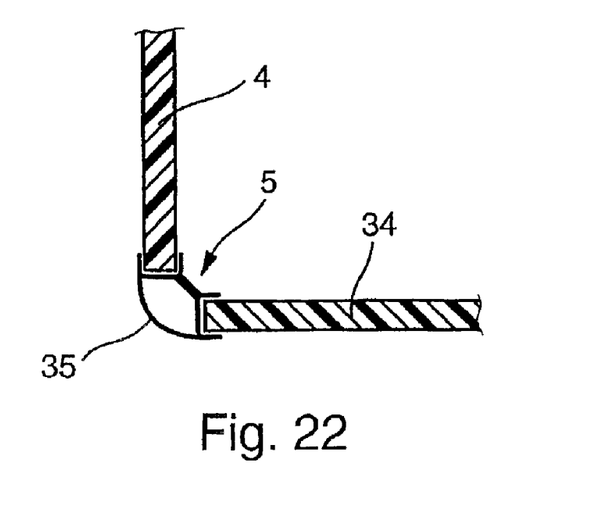

In the embodiment according to FIGS. 21 and 22 a functional track 5 is constructed as a tail profile 35, which interconnects two interior surfaces 4 and 34 and simultaneously has the desired additional function for the functional track 5. The interior surface 4 constitutes a side panel. The interior surface 34 is formed by a corresponding inside panel part of a tail mirror for a stepped tail limousine trunk.

What is claimed is:

1. A motor vehicle, having a motor vehicle carcass body, and with a luggage area having a bottom and with two facing side panels, with a plurality of spaced apart elongated functional tracks disposed in each of the side panels, the functional tracks being arranged at least one of horizontally and vertically in the side panels, the functional tracks further being mounted flush to inside surfaces of the side panels, and being connected by support sections with parts of the motor vehicle carcass body, wherein the functional tracks are formed by profile units, that are connected by support sections (11) to carcass body parts (10).

2. The motor vehicle according to claim 1, further comprising fastening elements operably configured to be insertably received in and affixed to the functional tracks.

3. The motor vehicle according to claim 1, wherein the functional tracks (5 to 7) are arranged in corresponding pairs disposed opposite one another in the side panels (4).

4. The motor vehicle according to claim 1, wherein segmenting parts (8), which are at least one of vertically positionable and horizontally positionable, are provided, which are equipped with fastening elements matched to the fastening functions of the functional tracks (5 to 7).

5. The motor vehicle according to claim 1, wherein covering parts (8), which are at least one of vertically positionable and horizontally positionable, are provided, which are equipped with fastening elements matched to the fastening functions of the profile rails (5 to 7).

* * * * *